United States Patent
Larson et al.

(10) Patent No.: US 12,162,624 B2
(45) Date of Patent: Dec. 10, 2024

(54) ATTENUATED ROLLER RESTRAINT FOR AIRCRAFT CARGO LOADING SYSTEMS

(71) Applicant: Goodrich Corporation, Charlotte, NC (US)

(72) Inventors: Wallace Harold Larson, Jamestown, ND (US); Brandon David Lee, Wahpeton, ND (US); Lynne M. Almvig, Mt. Vernon, WA (US); Zachary Meyer, Jamestown, ND (US); Michael A. Schulz, Jamestown, ND (US)

(73) Assignee: GOODRICH CORPORATION, Charlotte, NC (US)

( * ) Notice: Subject to any disclaimer, the term of this patent is extended or adjusted under 35 U.S.C. 154(b) by 837 days.

(21) Appl. No.: 17/207,395

(22) Filed: Mar. 19, 2021

(65) Prior Publication Data
US 2022/0297838 A1    Sep. 22, 2022

(51) Int. Cl.
B64D 9/00    (2006.01)

(52) U.S. Cl.
CPC ........ B64D 9/003 (2013.01); *B64D 2009/006* (2013.01)

(58) Field of Classification Search
CPC ...... B64D 9/003; B64D 2009/006; B60P 7/13
USPC .......................................................... 410/94
See application file for complete search history.

(56) References Cited

U.S. PATENT DOCUMENTS

| | | | | |
|---|---|---|---|---|
| 677,469 | A | * | 7/1901 | Rawles ............... B61G 9/10 213/38 |
| 3,906,870 | A | * | 9/1975 | Alberti ............... B64D 9/003 410/82 |
| 3,933,101 | A | | 1/1976 | Blas |
| 5,011,348 | A | * | 4/1991 | Jensen ............... B64D 9/003 410/79 |
| 5,316,242 | A | | 5/1994 | Eilenstein-Wiegmann et al. |
| 6,270,300 | B1 | * | 8/2001 | Huber ............... B60P 7/13 410/80 |
| 7,988,391 | B2 | | 8/2011 | Schulze |
| 2021/0376683 | A1 | * | 12/2021 | Schwarzer ........... H02K 5/141 |
| 2023/0073836 | A1 | * | 3/2023 | Storck, III ........... E06B 3/4636 |

FOREIGN PATENT DOCUMENTS

| | | | | |
|---|---|---|---|---|
| CN | 208746908 U | * | 4/2019 | |
| CN | 210884802 U | * | 6/2020 | |
| DE | 2620715 A | * | 11/1977 | ........... G21C 17/007 |
| DE | 4224819 C1 | * | 8/1993 | ............. B64D 9/003 |
| EP | 0581071 A1 | * | 2/1994 | |
| EP | 950562 A2 | * | 10/1999 | ................ B60P 7/13 |
| JP | H05341690 A | * | 12/1993 | |
| JP | H0647006 U | * | 6/1994 | |
| JP | H10294263 A | * | 11/1998 | |

* cited by examiner

*Primary Examiner* — Hilary L Gutman
(74) *Attorney, Agent, or Firm* — SNELL & WILMER L.L.P.

(57) ABSTRACT

A cargo restraint system includes a restraint including a roller that is passively moveable with respect to the restraint between a protruding position for reducing release loads while the restraint is under side loads from a cargo pallet and a retracted position whereby at least a portion of the side loads bypass the roller and are reacted directly through the restraint body.

12 Claims, 11 Drawing Sheets

ATTENUATED ROLLER RESTRAINT FOR AIRCRAFT CARGO LOADING SYSTEMS

FIELD

The present disclosure is directed to cargo loading systems for aircraft and, more particularly, to a cargo restraint system for restraining cargo in a cargo bay of an aircraft.

BACKGROUND

Many aircraft have at least one cargo bay designed to receive cargo. Such cargo bays include cargo loading systems that include rollers located on a floor of the cargo bay to provide conveyance for moving a unit load device (ULD, cargo) through the cargo bay. After cargo has been loaded into the cargo bay, it may be desirable to restrain the cargo. Such restraint reduces the likelihood of cargo shifting relative to the cargo bay during taxi, takeoff, flight, and landing. Also, it may also be desirable to selectively restrain and release ULDs. Some ULDs, like military pallets, have pockets along the sides of the pallet that are used to provide an interface for longitudinal or lateral restraint. The restraint that interfaces with these pockets moves in and out of the pocket during loading and unloading of the pallet.

SUMMARY

Described herein is a cargo restraint system for use with a cargo loading system of an aircraft. The restraint system includes a restraint configured to move between a lowered position and a raised position to restrain a cargo in the aircraft, and a roller disposed at least partially within the restraint, wherein the roller is moveable between a protruding position and a retracted position. As the restraint roller contacts a surface (e.g., a restraint pocket) of a ULD (e.g., a pallet or the like), the roller is able to roll, reducing friction as between the restraint and the ULD.

In various embodiments, cargo restraint system further comprises a spring member disposed at least partially within the restraint, wherein the spring member biases the roller towards the protruding position. As the roller enters the ULD's restraint pocket, it may be desirable for the roller to be spring biased to provide better alignment with the restraint pocket. During flight, it may be desirable for this bias feature to allow the roller to retract into the restraint, resulting in the restraint being able to react much higher loads than the roller could.

In various embodiments, the cargo restraint system further comprises a roller carrier disposed at least partially within the restraint, wherein the roller is mounted to the roller carrier, and the roller carrier and the roller move together between the protruding position and the retracted position.

In various embodiments, the cargo restraint system further comprises a roller shaft whereby the roller is mounted to the roller carrier.

In various embodiments, the cargo restraint system further comprises an oversized aperture disposed in the restraint, wherein a first end of the roller shaft and a second end of the roller shaft are disposed in the oversized aperture.

In various embodiments, the cargo restraint system further comprises a guide rod, wherein the spring member is supported by the guide rod.

In various embodiments, the cargo restraint system further comprises a guide rod aperture disposed in the roller carrier, wherein the guide rod is disposed at least partially within the guide rod aperture.

In various embodiments, the cargo restraint system further comprises a cavity disposed in the restraint, wherein the roller is disposed at least partially within the cavity.

In various embodiments, the cargo restraint system further comprises a mounting aperture disposed in the restraint, wherein the restraint is configured to rotate about the mounting aperture. In various embodiments, the mounting aperture is configured to receive a drive shaft whereby the restraint is rotated between a raised position and a lowered position and vice versa.

In various embodiments, the cargo restraint system further comprises a drain aperture disposed in the restraint, wherein the drain aperture is in fluid communication with the cavity.

A cargo restraint system for use with a cargo loading system of an aircraft is disclosed herein. The cargo restraint system comprises a restraint, a cavity disposed in the restraint, a roller disposed at least partially within the cavity, and a spring member disposed at least partially within the cavity. The spring member biases the roller towards a protruding position, wherein the roller protrudes from a side surface of the restraint in the protruding position.

In various embodiments, the spring member is configured to secure the roller in the protruding position against a first side load acting on the roller.

In various embodiments, the spring member is configured to compress to allow the roller to move to a retracted position in response to a second side load acting on the roller, wherein the second side load is greater than the first side load.

In various embodiments, the roller is positioned flush with the side surface when the roller is in the retracted position. In various embodiments, the roller is positioned inside the side surface when the roller is in the retracted position.

In various embodiments, at least a portion of the second side load bypasses the roller and is reacted through the side surface of the restraint in response to the roller moving to the retracted position.

In various embodiments, the cargo restraint system further comprises a mounting aperture disposed in the restraint, wherein a centerline axis of the mounting aperture is parallel to a centerline axis of the cavity.

In various embodiments, the cargo restraint system further comprises an oversized aperture disposed in the restraint.

In various embodiments, the cargo restraint system further comprises a roller shaft, wherein the roller shaft is moveable within the oversized aperture.

A cargo restraint system for use with a cargo loading system of an aircraft is disclosed herein. The cargo restraint system comprises a restraint configured to move between a lowered position and a raised position, and vice versa, to restrain a cargo in the aircraft, a first roller disposed at least partially within the restraint, a second roller disposed at least partially within the restraint. The first roller is moveable between a protruding position and a retracted position.

In various embodiments, the cargo restraint system further comprises a spring member disposed at least partially within the restraint, wherein the spring member is disposed between the first roller and the second roller. In various embodiments, the cargo restraint system further comprises a first roller carrier and a second roller carrier, wherein spring member is compressed between the first roller carrier and the second roller carrier.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosures, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the disclosure, it should be understood that other embodiments may be realized and that logical, chemical, and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

The present disclosure provide a restraint for an aircraft cargo loading system that includes one or more rollers configured to contact cargo (also referred to herein as a unit load device), such as a pallet for example. The roller is moveable between a first position and a second position. The restraint comprises a spring member that biases the roller to the first position, wherein the roller protrudes from a side surface of the restraint to react loads between the restraint and the cargo. By reacting loads via the roller, the coefficient of friction between the restraint and the ULD is reduced when the restraint is moved from a raised position to a lowered position, reducing the likelihood that the restraint is trapped in the raised position and increasing ease of movement of the restraint. In various modes of flight (e.g., take-off, landing, or high-G maneuvers during flight), the unit load device may transfer side loads into the restraint that overcome the bias of the spring member, causing the roller to move to the second position, wherein the unit load device contacts the restraint body directly whereby side loads are reacted between the unit load device and the restraint. In this manner, high side loads are reacted through the restraint body, which is better suited than the roller assembly for handling the high side loads. In this manner, at least a portion of the side loads bypass the roller and may be reacted directly through the restraint body. In this regard, the restraint of the present disclosure provides a roller that is passively moveable between a protruding position and a retracted position, to reduce the release loads (e.g., torque required to rotate the restraint from a raised position to a lowered position) while the restraint is under side load (e.g., produced by aircraft pitch and/or roll) or other forces reacted between the restraint and ULD during which a release of the ULD is desired.

Some ULDs, like military pallets for example, have pockets along the sides of the pallet that are used to provide an interface for longitudinal or lateral restraint. The restraint that interfaces with these pockets moves in and out of the pocket during loading and unloading of the pallet. As the restraint enters the pocket of the pallet, it may not perfectly align with the pocket resulting in resistance to move the restraint in or out of the pocket. Furthermore, forces between the pallet and the restraint—e.g., due to the cargo deck being oriented at a non-parallel angle with respect to the horizontal—may result in resistance to move the restraint in or out of the pocket. Reducing the resistance to engage and disengage the restraint from the pocket in the pallet may be desirable.

Figure 1:
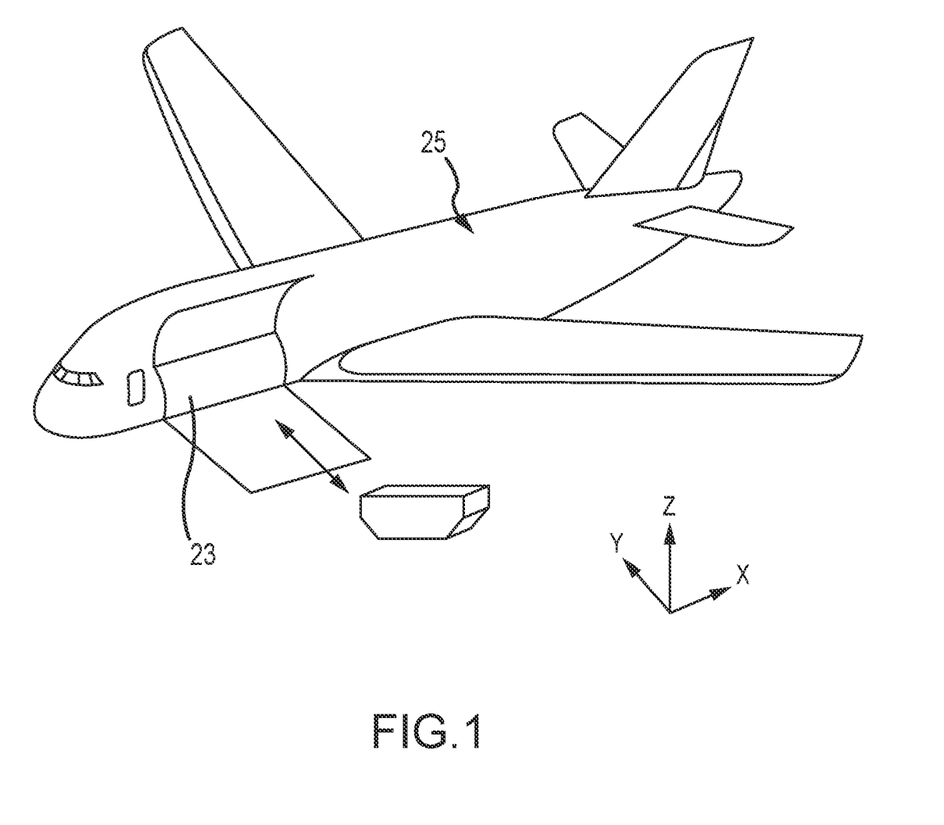
FIG. 1 illustrates an axonometric view of an aircraft being loaded with cargo, in accordance with various embodiments.
Figure 2:
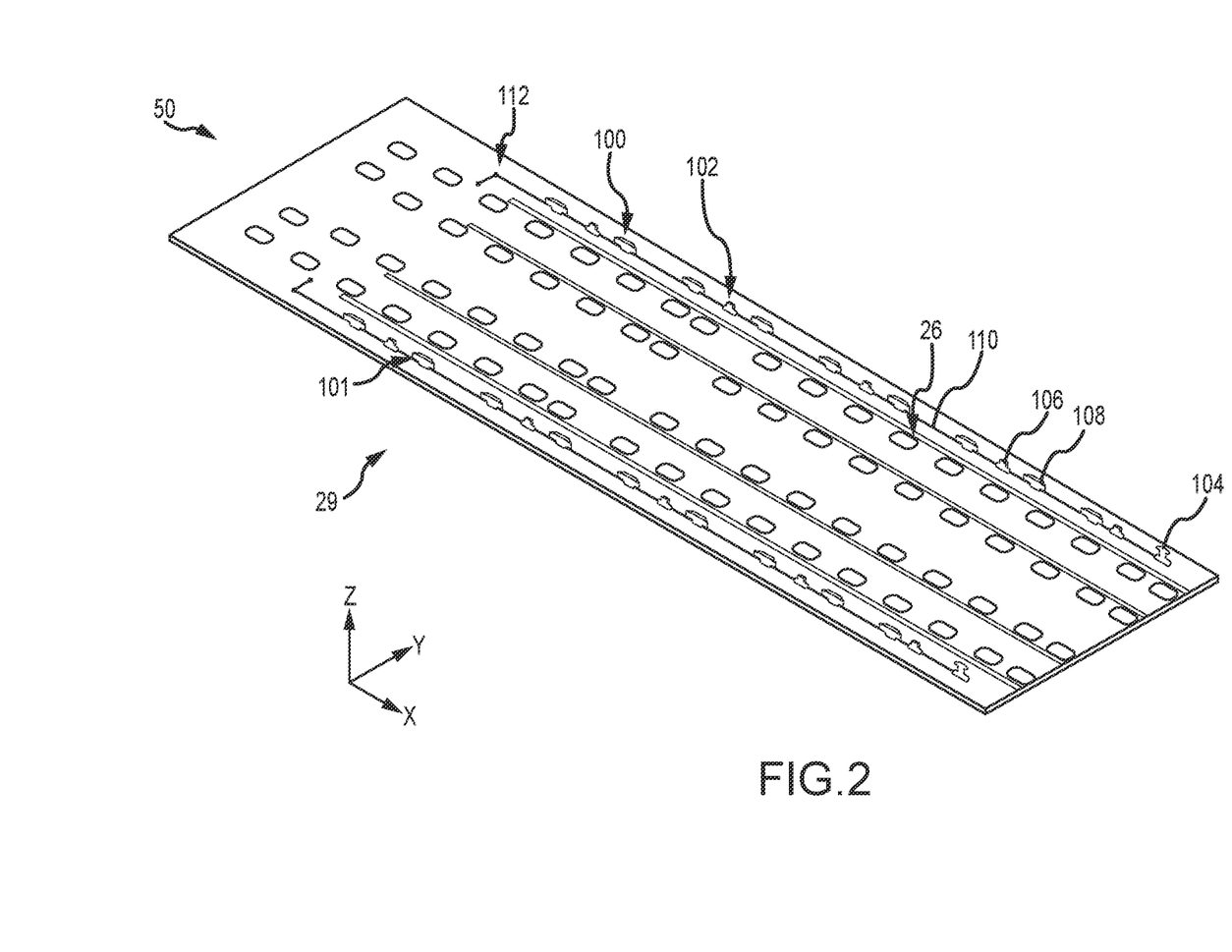
FIG. 2 illustrates a portion of an aircraft cargo deck having a cargo restraint system, in accordance with various embodiments.

FIG. 1 illustrates an aircraft 25 and FIG. 2 illustrates an aircraft cargo deck 29 and cargo loading, system 50 that can be used to implement various embodiments of the present disclosure. X-Y-Z axis is shown in various drawings to illustrate various orientations of components.

A compartment floor 26 forms a deck of an aircraft, adjacent a cargo bay loading door 23. However, there are many other aircraft cargo deck configurations to which the embodiments of the disclosure can be implemented. For example, various aircraft, particularly those configured primarily for the transportation of cargo without passengers, have the upper passenger deck removed and an additional larger cargo deck installed. As another example, an aircraft may include a cargo loading door at any location of the aircraft (e.g., instead of, or in addition to, the cargo bay loading door 23 on the left side of the aircraft 25). Other aircraft may have three or more parallel longitudinal tracks.

The cargo compartment may include a cargo loading system comprising a plurality of freely rotating conveyance rollers mounted in the cargo deck to define the conveyance plane. Cargo loaded onto the aircraft cargo deck can be moved manually throughout the cargo bay upon the freely rotating conveyance rollers.

Referring to FIG. 2, the cargo loading system 50 may include a cargo restraint system 101 used to restrain cargo (e.g., unit load devices (ULDs)) within the aircraft cargo deck 29. The cargo restraint system 101 may include a plurality of first restraints 102, a plurality of third restraints 100, and one or more second restraint 104. In various embodiments, one or more of the first restraints 102, the second restraints 104, and the third restraints 100 may be included. The first restraints 102 may include a first restraint 106 and may be referred to as X-restraints as they may restrict cargo along the X direction. The second restraint 104 may be referred to as a Z-restraint as it may restrict cargo along the Z direction. The third restraints 100 may include a third restraint 108 and may be referred to as YZ-restraints as they may restrict cargo along the Z direction and the Y direction. However, one skilled in the art will realize that the restraints 102, 104, 106 may be used to restrain cargo in any other directions (e.g., the first restraints 102 may restrain cargo along the Y direction, the Z direction, or the like). The restraint system 101 may include a control region 112 usable to control the first restraints 102 and the second restraint 104. A driving shaft 110 can extend through one or more of the restraints 104, 106, 108. One or more of the restraints 104, 106, 108 can rotate together with the driving shaft 110.

Figure 3:
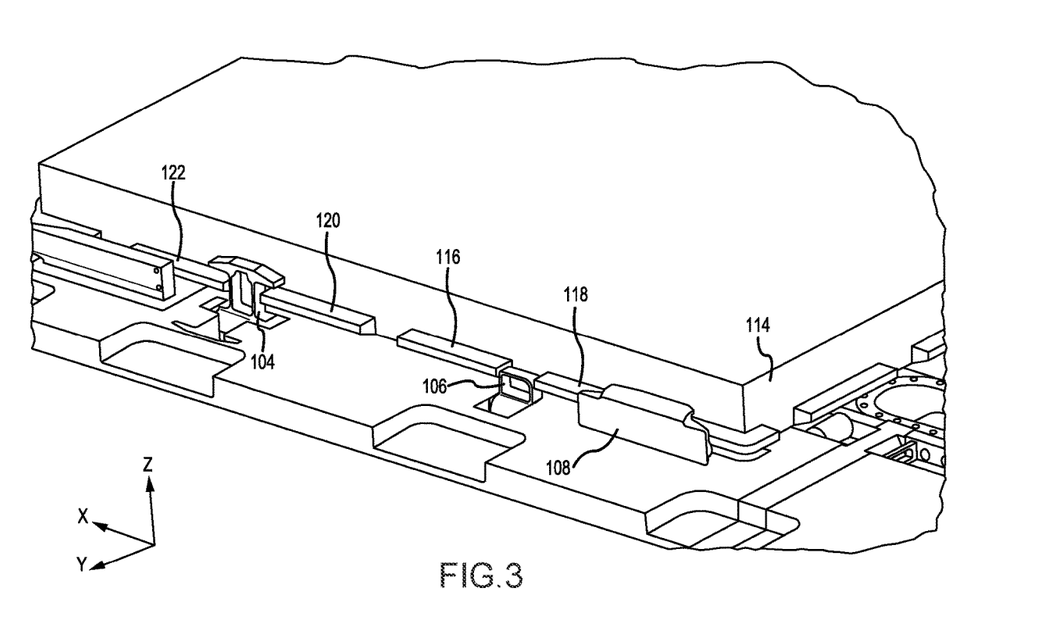
FIG. 3 illustrates a portion of the cargo restraint system of FIG. 2, in accordance with various embodiments.

FIG. 3 illustrates how the various restraints may restrain a ULD 114. As shown, the first restraint 106 may rest between tabs 116, 118 of the ULD 114, restricting movement of the ULD 114 along the X direction. The third restraint 108 may rest adjacent and above the tab 118, thus restricting movement of the ULD 114 in the Y and Z directions. The second restraint 104 may rest above tabs 120, 122 of the ULD 114, thus restricting movement of the ULD 114 in the Z direction.

Figure 4A:
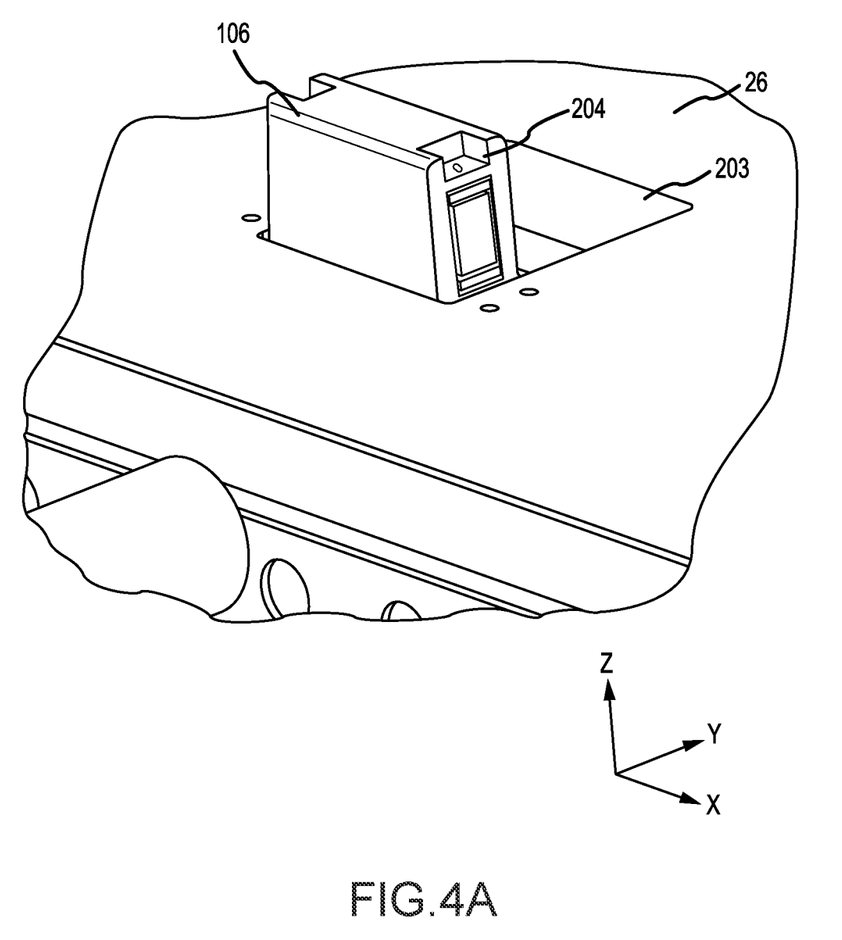
FIGS. 4A and 4B illustrate a first restraint of the cargo restraint system of FIG. 2 in a raised position and a lowered position, respectively, in accordance with various embodiments.
Figure 4B:
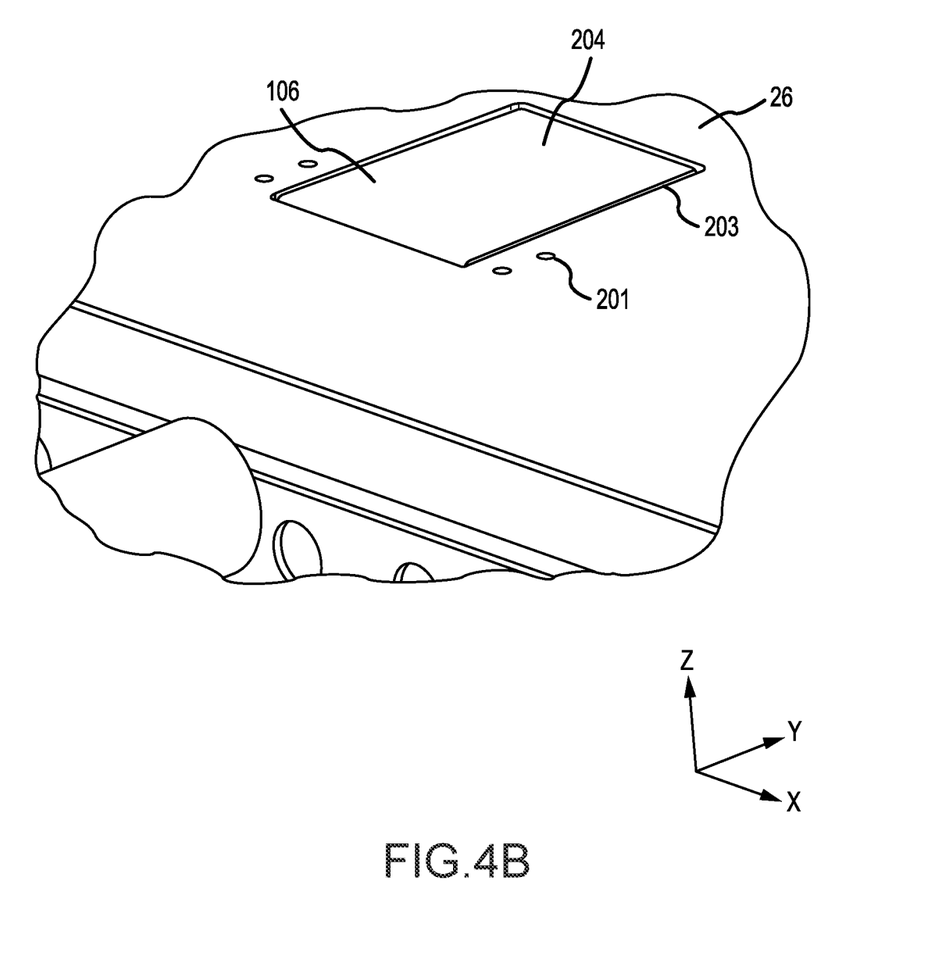

Referring now to FIGS. 4A and FIG. 4B, additional details of the first restraint 106 are shown. As shown, the first restraint 106 may be actuated between a raised position (as shown in FIG. 4A) and a lowered position (as shown in FIG. 4B). In various embodiments, first restraint 106 may pivot between the raised position and the lowered position. The first restraint 106 may be manipulated using the control region 112 of FIG. 2.

The first restraint 106 may include a head 204 (also referred to herein as a restraint body) which may be raised or lowered. In response to the head 204 being raised, it may rise above the compartment floor 26. In response to the head 204 being lowered, it may fit within an opening 203 of the compartment floor 26, thus causing it to lay relatively flush with the compartment floor 26. The first restraint 106 may be designed to be fastened to the compartment floor 26, such as by using fasteners through apertures 201 of compartment floor 26. However, first restraint 106 may be fastened to the compartment floor 26 via any suitable method.

Figure 5:
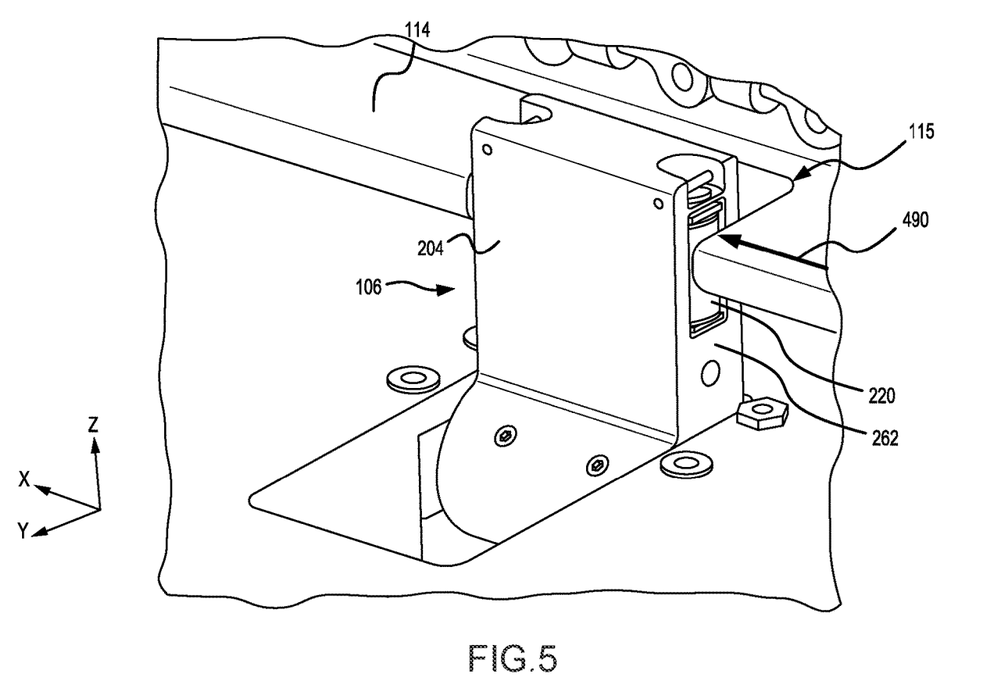
FIG. 5 illustrates the first restraint of the cargo restraint system of FIG. 2 in a raised position and reacting a side load from a unit load device, in accordance with various embodiments.

With reference to FIG. 5, first restraint 106 is illustrated in a raised position with a roller 220 protruding from side surface 262 of the head 204. Roller 220 may be spring loaded such that the roller 220 may retract into the first restraint 106, against the bias of the spring, in response to a load (represented by arrow 490) being transmitted from a ULD 114 into roller 220 and consequently first restraint 106.

First restraint 106 may be raised into a pocket 115 of the ULD 114. In embodiments, load 490 may be transmitted from ULD 114 into first restraint 106 when an aircraft is stationary on the ground, for example if the aircraft is oriented at an angle with respect to the horizontal direction such as in a nose-down attitude (i.e., with the nose pointed towards the ground) or a tail-down attitude (i.e., with the tail pointed towards the ground). Each roller 220 may be designed to be in a protruding position when an aircraft is stationary on the ground, particularly when first restraint 106 is loaded by side load 490. In this manner, roller 220 may reduce friction between ULD 114 and first restraint 106 when first restraint 106 pivots between a raised position (as shown in FIG. 4A and FIG. 5) and a lowered position (as shown in FIG. 4B). In this manner, first restraint 106 may allow for lower release forces when moving from the raised position to the lowered position to release ULD 114. Stated differently, forces reacting between ULD 114 and first restraint 106 are attenuated by the rollers to increase ease of movement of first restraint 106 when moving from the raised position and the lowered position.

Figure 6:
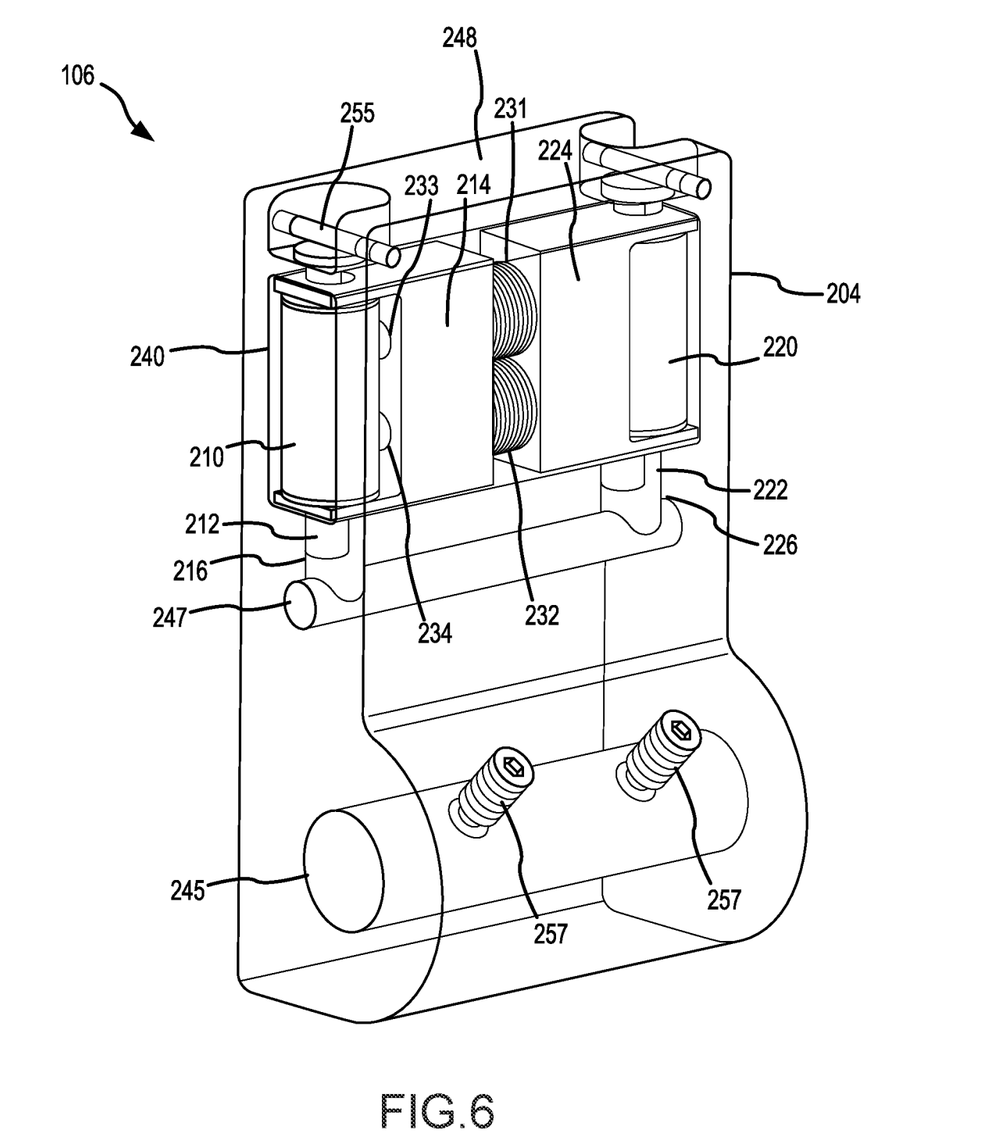
FIG. 6 illustrates an isometric view of the first restraint of the cargo restraint system of FIG. 2 with the restraint body transparent to show a roller/spring assembly disposed in the restraint body, in accordance with various embodiments.
Figure 7:
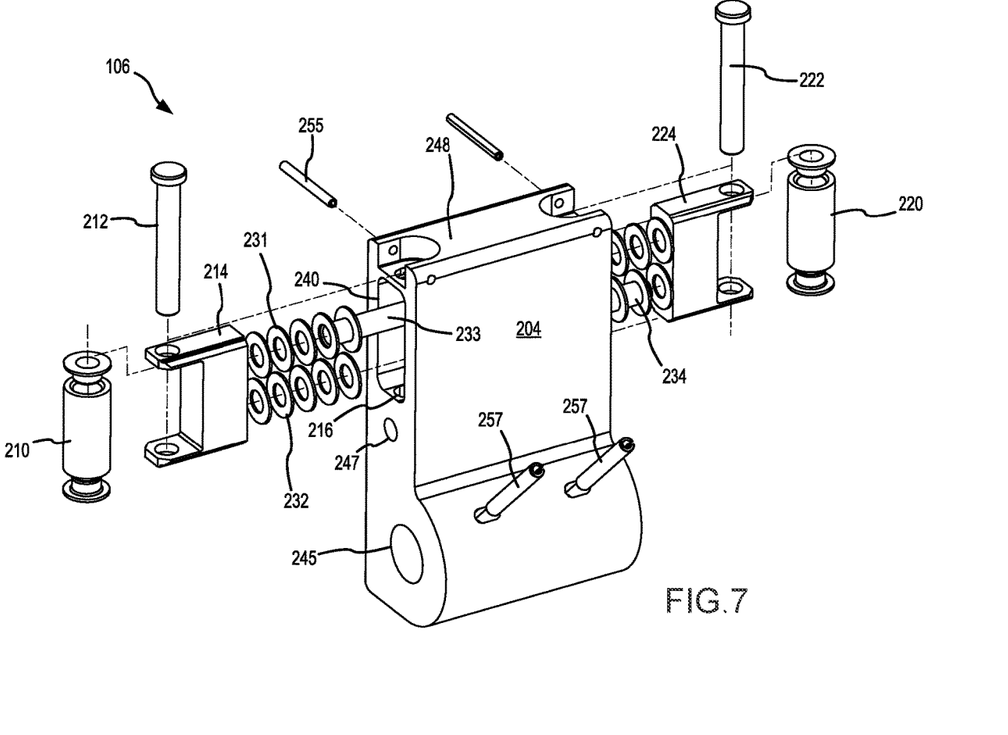
FIG. 7 illustrates an exploded view of the first restraint of the cargo restraint system of FIG. 2, in accordance with various embodiments.

With reference to FIG. 6 and FIG. 7, a perspective view and exploded view, respectively, of restraint 106 is illustrated. In FIG. 6, the body of restraint 106 is transparent for clarity purposes. In various embodiments, restraint 106 comprises a first roller 210 and second roller 220 disposed at least partially within a cavity 240 disposed in head 204. Roller 210 may be mounted on a roller carrier 214 via a roller shaft 212. Roller 220 may be mounted on a roller carrier 224 via a roller shaft 222. Roller 210 and/or roller 220 may be biased outwards (e.g., in the X dimension, but in opposite directions in the X dimension) by one or more spring members, such as a first spring member 231 and a second spring member 232. First spring member 231 and second spring member 232 may be disposed between roller carrier 214 and roller carrier 224. In various embodiments, roller carrier 214 may move with respect to a first guide rod 233 and a second guide rod 234. In various embodiments, roller carrier 224 may move with respect to first guide rod 233 and second guide rod 234. First guide rod 233 and second guide rod 234 may support first spring member 231 and second spring member 232. First spring member 231 and second spring member 232 may bias both roller 210 and roller 220. However, it is contemplated herein that roller 210 and roller 220 may each have one or more dedicated spring members.

In various embodiments, roller shaft 212 may extend, at either end, into an oversized bore or aperture 216 disposed in head 204. Roller shaft 222 may similarly extend, at either end, into an oversized bore or aperture 226 disposed in head 204. A drain aperture 247 may be disposed in head 204. Drain aperture 247 may be in fluid communication with cavity 240 via aperture 216. Drain aperture 247 may be in fluid communication with cavity 240 via aperture 226. In this manner, drain aperture 247 may provide a path whereby liquids and/or debris may exit cavity 240, aperture 216, and/or aperture 226.

In various embodiments, roller shaft 212 may be moved through the end surface 248 of restraint 106, parallel the centerline axis of aperture 216, into aperture 216. In embodiments, a pin 255 may be disposed at the opening of aperture 216 to physically block roller shaft 212 from exiting aperture 216.

In various embodiments, lock screws 257 may be provided at mounting aperture 245 to lock restraint 106 to a shaft such that the restraint 106 rotates with the shaft (e.g., between a raised position (see FIG. 4A) and a lowered position (see FIG. 4B).

Figure 8A:
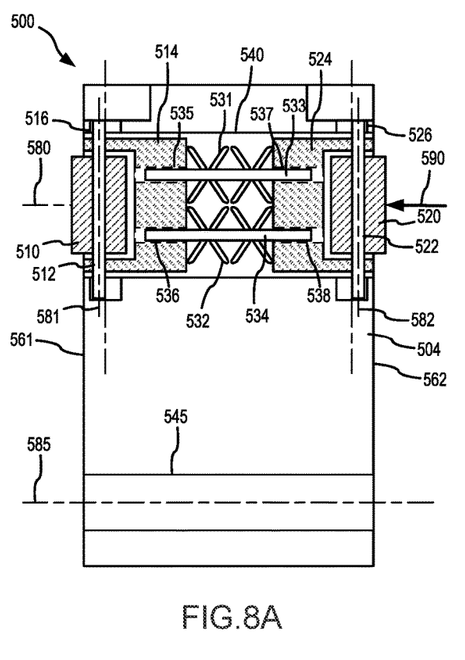
FIGS. 8A and 8B illustrate schematic views of a restraint reacting a first side load during a release operation and reacting a second side load during a high-G maneuver, respectively, in accordance with various embodiments.

With reference to FIG. 8A through FIG. 8F, an exemplary restraint 500 (also referred to herein as a first restraint) is illustrated, in accordance with various embodiments. Restraint 106 may be similar to restraint 500, in accordance with various embodiments. Restraint 500 comprises a first roller 510 disposed at a first side (e.g., at side surface 561) and a second roller 520 disposed at a second side (e.g., at side surface 562), though it is contemplated herein that a restraint 500 may comprise only a single roller disposed at either the first side or the second side. Roller 510 and roller 520 may be disposed at least partially within a cavity 540 disposed in head 504 of restraint 500. Roller 510 and/or roller 520 may be biased outwards (e.g., in the X dimension, but in opposite directions in the X dimension) by one or more spring members, such as a first spring member 531 and a second spring member 532. However, any number of spring members, including one or more spring members, may be used for biasing roller 510 and/or roller 520. In various embodiments, first spring member 531 and second spring member 532 are compressed between roller carrier 514 and roller carrier 524. Roller 510 and roller 520 may be mounted to head 504 via a first roller shaft 512 and a second roller shaft 522, respectively. In this manner, roller 510 may rotate about a first roller axis 581 and roller 520 may rotate about a second roller axis 582. First roller axis 581 and second roller axis 582 may each be a floating axis. Stated differently, each of first roller axis 581 and second roller axis 582 may move with respect to head 504. First roller shaft 512 and second roller shaft 522 may be mounted to head 504 in a free floating manner such that roller 510 and roller 520 may move between a protruding position (as shown in FIG. 8A) and a retracted position (as shown by roller 520 in FIG. 8B).

During a release operation, roller 510 and roller 520 may be in their respective protruding positions to provide a rolling surface against which a ULD (e.g., ULD 114) may contact to allow for low release forces when the restraint 500 moves from the raised position (see FIG. 4A) to the lowered position (see FIG. 4B) to release the ULD (e.g., ULD 114). In this regard, a load (e.g., as represented by arrow 590) may be transmitted between a ULD and roller 520. The bias of spring member 531 and spring member 532 is greater than the bias of load 590 such that the roller 520 remains protruded from head 504 to provide a rolling surface against which the ULD is engaged. Stated differently, spring member 531 and spring member 532 may be configured to secure roller 520 in the protruding position against the bias of load 590. In the protruding position, roller 510 and/or roller 520 may protrude from side surface 561 and/or side surface 562, respectively. In the retracted position, roller 510 and/or roller 520 may be flush with side surface 561 and/or side surface 562, respectively. In the retracted position, roller 510 and/or roller 520 may be positioned inside side surface 561 and/or side surface 562, respectively (i.e., spaced apart from the plane of side surface 561 and/or side surface 562, also referred to as "below flush").

Figure 8B:
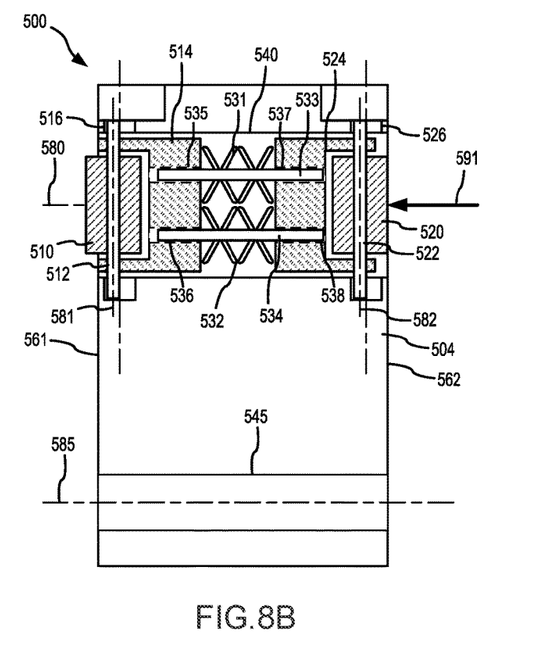
Figure 8C:
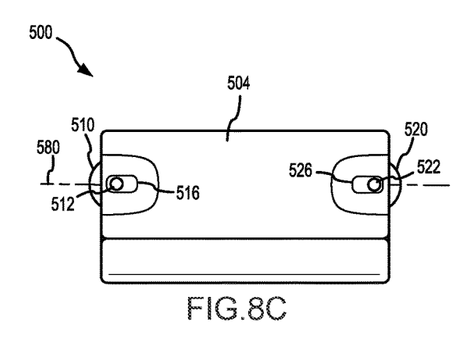
FIGS. 8C and 8D illustrate top views of the restraint of FIG. 8A and FIG. 8B, respectively, in accordance with various embodiments.
Figure 8D:
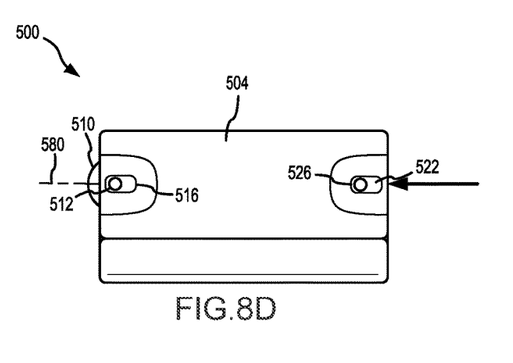
Figure 8E:
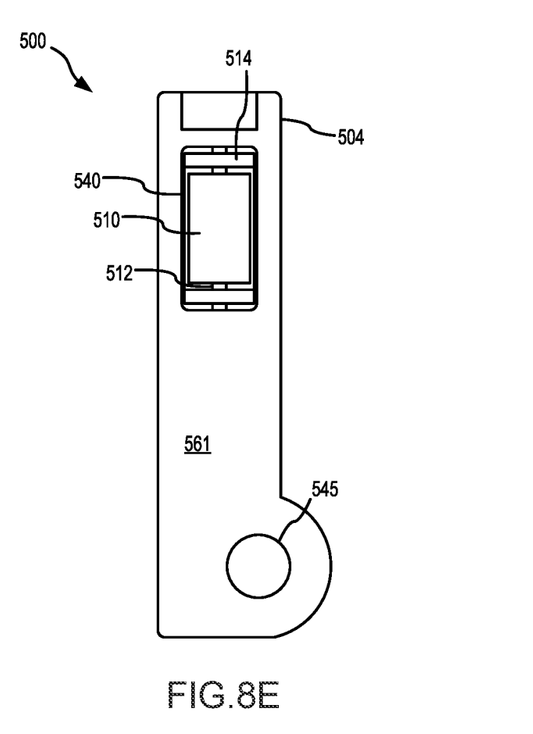
FIGS. 8E and 8F illustrate side views of the restraint of FIG. 8A and FIG. 8B, respectively, in accordance with various embodiments.
Figure 8F:
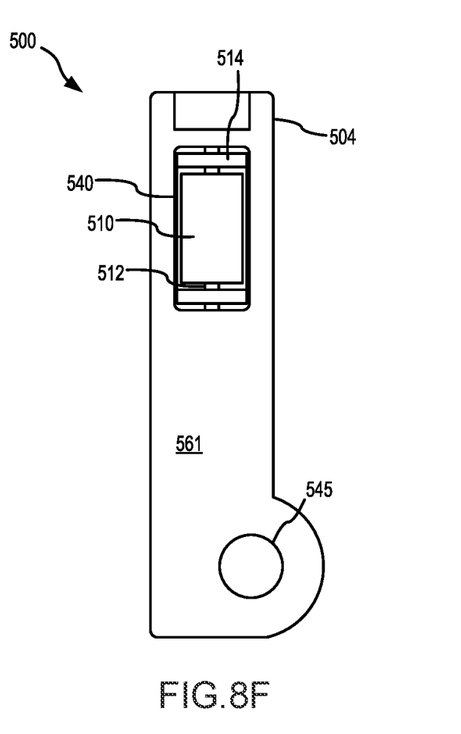

During various phases of flight of an aircraft, high loads (e.g., during high-G maneuvers) (as illustrated by arrow 591) may be transmitted from a ULD to restraint 500 which causes roller 520 to compress into head 504 to a retracted position. Although described herein with respect to roller 520, roller 510 may similarly be moved between the protruding and retracted position. The spring force of spring members 531 and spring member 532 may be designed depending on the weight of the cargo, the pitch of the aircraft during cargo release operations, among other factors. In general, the spring force of spring members 531 and spring member 532 may be designed such that roller 510 and roller 520 are protruding during a release operation of a ULD to allow for the restraint 500 to more easily pivot between the raised position (see FIG. 4A) and the lowered position (see FIG. 4B), but to allow roller 510 and roller 520 to compress into restraint 500 during flight or other maneuvers where high loads are transmitted between a ULD and restraint 500 such that the ULD contacts side surface 561 or side surface 562 of restraint 500 to react the high loads directly into head 504 which can support the high load.

In various embodiments, cavity 540 may comprise a generally rectangular aperture extending through head 504. Cavity 540 may define a centerline axis 580 extending transversely through restraint 500. In embodiments, cavity 540 extends from first side surface 561 to second side surface 562.

In various embodiments, restraint 500 further comprises a first roller carrier 514 associated with the first roller 510 and a second roller carrier 524 associated with the second roller 520. Roller 510 may be mounted to roller carrier 514 via roller shaft 512. In this manner, roller 510, roller shaft 512, and roller carrier 514 may move together within cavity 540 with respect to head 504. Roller 520 may be similarly mounted to roller carrier 524 via roller shaft 522. In this manner, roller 520, roller shaft 522, and roller carrier 524 may move together within cavity 540 with respect to head 504.

In various embodiments, roller shaft 512 may extend, at either end, into an oversized bore or aperture 516 disposed in head 504. Roller shaft 512 may be captured, at either end, in aperture 516. In this manner, roller shaft 512 may move within aperture 516 together with roller 510 and roller carrier 514 between the protruding position and the retracted position. Roller shaft 522 may similarly extend, at either end, into an oversized bore or aperture 526 disposed in head 504. Roller shaft 522 may be similarly captured, at either end, in aperture 526. In various embodiments, the diameter of roller shaft 512 and roller shaft 522 is less than a diameter of aperture 516 and aperture 526, respectively, wherein the term "diameter" can refer to a "maximum width," measured perpendicular the axis of the aperture, in the event of a non-circular aperture (e.g., ovular, elliptic, rectangular, etc.).

In various embodiments, with particular focus on FIG. 8B, as roller 520 moves towards a retracted position, load 591 may be reacted from roller 520, into roller shaft 512, into roller carrier 524, and into spring member 531 and spring member 532. Roller carrier 524 may ride on a first guide rod 533 and a second guide rod 534. The movement of roller carrier 524 may be guided by first guide rod 533 and second guide rod 534. First guide rod 533 and second guide rod 534 may extend into respective guide rod apertures 537, 538 disposed in roller carrier 524. Likewise, an opposite end of first guide rod 533 and second guide rod 534 may extend into respective guide rod apertures 535, 536 disposed in roller carrier 514. In this manner, first guide rod 533 and a second guide rod 534 may extend between roller carrier 514 and roller carrier 524. First guide rod 533 and a second guide rod 534 may be oriented parallel to axis 580. Roller carrier 514 may ride on first guide rod 533 and second guide rod 534 similar to roller carrier 524. Furthermore, first guide rod 533 may extend through and support first spring member 531 and second guide rod 534 may extend through and support second spring member 532. Roller carrier 514 and roller carrier 524 may move along axis 580 between their respective retracted and protruding positions.

In various embodiments, spring member 531 and spring member 532 each comprises a compressive spring disposed over guide rod 533 and guide rod 534, respectively. In various embodiments, spring member 531 and spring member 532 each comprise a compression spring, such as a coil spring, one or more Bellevue washers stacked in series, or any other suitable spring. In various embodiments, spring member 531 and spring member 532 comprise a cantilever spring, a leaf spring, a tension spring, or any other suitable spring. Spring member 531 and spring member 532 may be made of a spring steel material. In various embodiments, spring member 531 and spring member 532 may be made from a rubber material, such as a silicone rubber material, that compresses between roller carrier 514 and roller carrier 524. It is contemplated herein that spring member 531 and/or spring member 532 may be of any appropriate configuration to provide the biasing function for the corresponding roller.

In various embodiments, a mounting aperture 545 is disposed in restraint 500 for pivotally mounting restraint 500 to a cargo system shaft whereby restraint 500 is rotated between a raised position (as shown in FIG. 4A and FIG. 5) and a lowered position (as shown in FIG. 4B). In embodiments, in order to manipulate the head 504 from the raised position to the lowered position, the shaft may be actuated (e.g., rotated) in a direction corresponding to the desired direction of rotation of the head 504 (i.e., rotating the head 504 towards and into the compartment floor 26 or rotating the head 504 away from and out the compartment floor 26). Mounting aperture 545 may define a centerline axis 585. In various embodiments, axis 585 and axis 580 are oriented parallel to each other.

In various embodiments, head 504, roller 510, roller 520, roller carrier 514, roller carrier 524, roller shaft 512, roller shaft 522, guide rod 533, and guide rod 534 may be made from a metal material, such as aluminum, steel, or alloys thereof. In various embodiments, roller 510 and roller 520 may be made from a nonmetal material such as a plastic material. In various embodiments, roller 510 and roller 520 may be mounted to roller shaft 512 and roller shaft 522, respectively, via one or more bearings, bushings, or the like.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is intended to invoke 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A cargo restraint system for use with a cargo loading system of an aircraft, the cargo restraint system comprising:
   a restraint configured to move between a lowered position and a raised position to restrain a cargo in the aircraft;
   a roller disposed at least partially within the restraint, the roller is moveable between a protruding position and a retracted position;
   a guide rod;
   a spring member disposed at least partially within the restraint and supported by the guide rod, the spring member biases the roller towards the protruding position;
   a roller carrier disposed at least partially within the restraint, the roller is mounted to the roller carrier, and the roller carrier and the roller move together between the protruding position and the retracted position;
   a roller shaft whereby the roller is mounted to the roller carrier; and
   an oversized aperture disposed in the restraint, wherein a first end of the roller shaft and a second end of the roller shaft are disposed in the oversized aperture.

2. The cargo restraint system of claim 1, further comprising a guide rod aperture disposed in the roller carrier, wherein the guide rod is disposed at least partially within the guide rod aperture.

3. The cargo restraint system of claim 1, further comprising a cavity disposed in the restraint, wherein the roller is disposed at least partially within the cavity.

4. The cargo restraint system of claim 3, further comprising a drain aperture disposed in the restraint, wherein the drain aperture is in fluid communication with the cavity.

5. The cargo restraint system of claim 1, further comprising a mounting aperture disposed in the restraint, wherein the restraint is configured to rotate about the mounting aperture.

6. A cargo restraint system for use with a cargo loading system of an aircraft, the cargo restraint system comprising:
 a restraint;
 a cavity disposed in the restraint;
 a roller disposed at least partially within the cavity;
 an oversized aperture disposed in the restraint;
 a roller shaft moveable within the oversized aperture; and
 a spring member disposed at least partially within the cavity and configured to secure the roller in a protruding position against a first side load acting on the roller, the spring member is further configured to compress to allow the roller to move to a retracted position in response to a second side load acting on the roller, wherein the second side load is greater than the first side load;
 wherein the spring member biases the roller towards the protruding position, wherein the roller protrudes from a side surface of the restraint in the protruding position, and the roller is positioned at least one of flush with and inside the side surface when the roller is in the retracted position.

7. The cargo restraint system of claim 6, wherein at least a portion of the second side load bypasses the roller and is reacted through the side surface of the restraint in response to the roller moving to the retracted position.

8. The cargo restraint system of claim 6, further comprising a mounting aperture disposed in the restraint, wherein a centerline axis of the mounting aperture is parallel to a centerline axis of the cavity.

9. The cargo restraint system of claim 6, wherein an axis of rotation of the roller moves together with the roller with respect to a body of the restraint between the retracted position and the protruding position.

10. A cargo restraint system for use with a cargo loading system of an aircraft, the cargo restraint system comprising:
 a restraint configured to move between a lowered position and a raised position to restrain a cargo in the aircraft;
 a first roller disposed at least partially within the restraint;
 a first roller carrier disposed at least partially within the restraint, the first roller is mounted to the first roller carrier, and the first roller carrier and the roller move together between a protruding position and a retracted position;
 a roller shaft whereby the first roller is mounted to the first roller carrier;
 a guide rod;
 a spring member disposed at least partially within the restraint and supported by the guide rod, the spring member biases the first roller towards the protruding position;
 a second roller disposed at least partially within the restraint, the spring member is disposed between the first roller and the second roller; and
 a second roller carrier, the second roller is mounted to the second roller carrier, and the spring member is compressed between the first roller carrier and the second roller carrier.

11. The cargo restraint system of claim 10, wherein a first axis of rotation of the first roller moves together with the first roller with respect to the restraint between the protruding position and the retracted position.

12. Cargo restraint system of claim 1, wherein an axis of rotation of the roller moves together with the roller with respect to a body of the restraint between the protruding position and the retracted position.

* * * * *